(12) United States Patent
Dornbach et al.

(10) Patent No.: US 9,964,965 B2
(45) Date of Patent: *May 8, 2018

(54) METHOD OF CONTROLLING PROPORTIONAL MOTION CONTROL VALVE

(71) Applicant: HydraForce, Inc., Lincolnshire, IL (US)

(72) Inventors: David Dornbach, Waukesha, WI (US); Anthony Casale, Wauconda, IL (US); Tomasz Slawinski, Northbrook, IL (US)

(73) Assignee: HydraForce, Inc., Lincolnshire, IL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/310,623

(22) Filed: Jun. 20, 2014

(65) Prior Publication Data

US 2014/0299197 A1    Oct. 9, 2014

Related U.S. Application Data

(62) Division of application No. 12/965,636, filed on Dec. 10, 2010, now Pat. No. 8,757,208.

(Continued)

(51) Int. Cl.
*G05D 16/20* (2006.01)
*F16K 27/04* (2006.01)
(Continued)

(52) U.S. Cl.
CPC ....... *G05D 16/2093* (2013.01); *F16K 27/041* (2013.01); *F16K 27/048* (2013.01);
(Continued)

(58) Field of Classification Search
CPC .......................... F15B 21/087; G05D 16/2093
See application file for complete search history.

(56) References Cited

U.S. PATENT DOCUMENTS 4,674,613 A    6/1987  Sikorski
4,718,329 A *  1/1988  Nakajima ............. F15B 21/087
                                              91/445

(Continued)

OTHER PUBLICATIONS

International Searching Authority, International Search Report and Written Opinion in International Application No. PCT/US2010/059944, dated Feb. 15, 2011.

*Primary Examiner* — Eric Keasel
(74) *Attorney, Agent, or Firm* — Leydig, Voit & Mayer, Ltd.

(57) ABSTRACT

A proportional motion control valve includes an electromechanical actuator that provides an infinitely controlled pressure setting in response to an electric signal applied to the electro-mechanical actuator. In another aspect, a proportional motion control valve includes a pilot-operated valve disposed intermediately with respect to a cage and a valve body to fluidly isolate an internal cavity of the valve body from a bore of the cage. The pilot-operated valve is subjected to a hydraulic opening force of pilot fluid that is present in the bore of the cage. A spring is disposed within the internal cavity of the valve body and arranged to subject the pilot-operated valve to a closing spring force.

12 Claims, 4 Drawing Sheets

Related U.S. Application Data (60) Provisional application No. 61/285,336, filed on Dec. 10, 2009.

(51) Int. Cl.
*F16K 31/42* (2006.01)
*G05D 16/16* (2006.01)

(52) U.S. Cl.
CPC ......... *F16K 31/426* (2013.01); *G05D 16/166* (2013.01); *Y10T 137/0379* (2015.04); *Y10T 137/0396* (2015.04); *Y10T 137/8659* (2015.04); *Y10T 137/86614* (2015.04)

(56) References Cited

U.S. PATENT DOCUMENTS

| | | | |
|---|---|---|---|
| 4,796,661 A | | 1/1989 | Hishinuma et al. |
| 4,864,822 A | * | 9/1989 | Wachs ............... G05D 16/2093 60/427 |
| 4,967,557 A | * | 11/1990 | Izumi ................... F15B 21/087 60/423 |
| 5,138,838 A | * | 8/1992 | Crosser ................ F15B 21/087 60/426 |
| 5,289,679 A | * | 3/1994 | Yasuda ................. F15B 11/163 60/422 |
| 5,481,872 A | * | 1/1996 | Karakama ............... F15B 11/17 60/421 |
| 5,664,417 A | | 9/1997 | Wilke et al. |
| 6,116,263 A | | 9/2000 | Liberfarb |
| 6,167,906 B1 | | 1/2001 | Liberfarb |
| 6,267,350 B1 | | 7/2001 | Slawinski et al. |
| 6,330,798 B1 | | 12/2001 | Stephenson |
| 6,554,014 B2 | | 4/2003 | Beyrak |
| 6,571,828 B2 | | 6/2003 | Harms et al. |
| 6,789,570 B2 | | 9/2004 | Beyrak et al. |
| 6,805,155 B2 | | 10/2004 | Slawinski et al. |
| 6,854,703 B2 | | 2/2005 | Parker et al. |
| 6,880,332 B2 | * | 4/2005 | Pfaff .................... F15B 21/087 60/422 |
| 6,966,329 B2 | | 11/2005 | Liberfarb |
| 7,063,100 B2 | | 6/2006 | Liberfarb |
| 7,069,945 B2 | | 7/2006 | Slawinski et al. |
| 7,089,733 B1 | * | 8/2006 | Jackson ............... G05D 16/208 60/422 |
| 7,137,406 B2 | | 11/2006 | Slawinski et al. |
| 7,222,484 B1 | | 5/2007 | Dornbach |
| 7,261,030 B2 | | 8/2007 | Liberfarb et al. |
| 7,484,814 B2 | | 2/2009 | Dornbach |
| 8,757,208 B2 | * | 6/2014 | Dornbach ............. F16K 27/041 137/625.61 |
| 2004/0089830 A1 | | 5/2004 | Beyrak |
| 2004/0129322 A1 | | 7/2004 | Chen |
| 2008/0017261 A1 | | 1/2008 | Harms et al. |
| 2009/0050222 A1 | | 2/2009 | Jackson et al. |
| 2010/0024200 A1 | | 2/2010 | Alexander et al. |

* cited by examiner

METHOD OF CONTROLLING PROPORTIONAL MOTION CONTROL VALVE

CROSS-REFERENCE TO RELATED APPLICATION

This patent application is a divisional of co-pending U.S. patent application Ser. No. 12/965,636, filed Dec. 10, 2010, which claims the benefit of priority to U.S. Provisional Patent Application No. 61/285,336, filed Dec. 10, 2009, and entitled "Proportional Motion Control Valve," both of which are incorporated in their entireties herein by this reference.

BACKGROUND

A hydraulic circuit relies on a pump to push oil through a control valve and into an actuator, such as a cylinder or motor. The actuator typically moves a load against gravity. At times, the force required to overcome gravity substantially reduces and, in fact, gravity may take over and tend to drive the actuator via its connection to the load. This condition is commonly referred to as an "over-center" condition of the load. During an over-center condition, the load is no longer controlled by flow of fluid from the pump. As such, the load begins to "run-away" from the pump and its motion is controlled by the acceleration of gravity.

To avoid operating under such conditions, hydraulic systems often include motion control valves, which are also known as a counterbalance valves, operating to retard motion of an actuator during an over-center condition and preserve control of the load by the flow and pressure of fluid provided by the pump. In general, a counterbalance valve is a pressure control valve.

In pressure control valves, a pressure setting of the valve is proportional to the magnitude of the force of a spring acting on the active element (typically referred to as a spool) of the valve. Thus, a typical pressure control valve may include a single spring or, for valves having higher pressure settings, a series of springs directly pushing against an active element. It can be appreciated that valves that include multiple springs will be physically larger to accommodate the springs.

The active element, or spool, is disposed to selectively control a flow path interconnecting the actuator and a tank or reservoir of the hydraulic system. In the case of a counterbalance valve, the more the load tends to "run-away" from the oil supplied by the pump, the more the spring pushes on the active element in a closing direction. In turn, the flow of oil is restricted until flow from the pump matches the motion of the load.

Thus, the counterbalance valve is able to control motion of the actuator during an "over-center" condition. However, circuits using such known counterbalance valves are inefficient to operate. For example, friction caused by the restriction of oil flow causes a temperature increase of the oil. Further, power from the prime mover driving the pump (e.g. internal combustion engine) is wasted.

Under operating conditions when the load is being controlled by pump flow (a non-over-center condition), the counterbalance valve should not restrict the flow of oil therethrough. For this reason, a typical counterbalance valve includes means for reducing the effective spring setting of the spring acting upon the active element.

For example, a separate port, which is commonly referred to as a pilot port, is connected to a pilot chamber within the valve. During operation, load-induced pressure is provided to the pilot chamber. The pilot chamber is typically opposite the load pressure port and is directly linked to the moveable spool element, which is the same spool that exhausts the fluid to tank. The hydraulic area of the pilot chamber is typically larger than that of the exhaust chamber to permit motion of the spool out of the flow path in the presence of sufficient load pressure at the pilot port during non-over-center valve operation.

In known valves, a large ratio between the pilot chamber and exhaust chamber areas is desirable because it enables motion of the spool at relatively low load pressures. The large ratio also minimizes flow restriction through the valve when motion control is not required. On the other hand, a small ratio is desirable to provide system stability during over-center operation. The small ratio provides a quick response time for the valve when the load pressure decreases in response to an over-center condition.

Counterbalance valves are typically used in circuits where the flow into the actuator is controlled by a device know as a flow control. In such circuits, the counterbalance valve controls the exhaust flow. One example of such a circuit is known as a bridge circuit. Bridge circuits are inherently stable systems because of the function of the counterbalance valve(s) they include. A conventional bridge circuit arrangement can include four flow control valves, two of which are provided to control the flow of fluid into an actuator, and the other two to control the exhaust flow of fluid out of the actuator.

In known systems, the position of the actuator and pressure of the system are monitored to determine when a load has moved into an over-center condition. As the load moves into an over-center condition, the system attempts to predict the amount of restriction that should be imposed on the system. Such predictive control takes time to complete and demands computational capacity that would otherwise have been used for other functionality of the system. Moreover, system calibration is specific to a given system and must be conducted for each type of system individually.

BRIEF SUMMARY OF THE DISCLOSURE

In one embodiment, a proportional motion control valve includes an electro-mechanical actuator that provides an infinitely controlled pressure setting in response to an electric signal applied to the electro-mechanical actuator. In one aspect, a proportional motion control valve is constructed such that its pressure setting can vary based upon the current applied to its coil.

In yet another embodiment, a proportional motion control valve includes a cage having a longitudinal bore. A spool is moveably disposed within the bore of the cage. The spool has a longitudinal bore in which a poppet is moveably disposed. A valve body is connected to the cage and defines an internal cavity that is fluidly connectable with the bore of the cage. A pilot-operated valve is disposed intermediately with respect to the cage and the valve body to fluidly isolate the internal cavity of the valve body from the bore of the cage. The pilot-operated valve is subjected to a hydraulic opening force of pilot fluid that is present in the bore of the cage. A spring is disposed within the internal cavity of the valve body and arranged to subject the pilot-operated valve to a closing spring force.

In still a further aspect, the disclosure describes the use of a proportional motion control valve in an application circuit. In one embodiment, a method of controlling a proportional motion control valve can be performed. A load pressure in a circuit arrangement between an actuator and a pump is sensed. A load pressure signal corresponding to the sensed load pressure is sent to an electronic controller. The electronic controller is operably connected to an electro-mechanical actuator of a proportional motion control valve. A pressure setting of the proportional motion control valve is adjusted by providing a command signal to the electro-mechanical actuator. The command signal is based on the load pressure signal.

DETAILED DESCRIPTION

An embodiment of a counterbalance valve or motion control valve in accordance with the disclosure is arranged to restrict a flow of oil therethrough in response to pressure induced by a load on an actuator such that the restriction is limited to a point to stabilize the system. When the counterbalance valve is not required to control the load in an over-center condition, the spring setting may be selectively adjusted. That is, the pressure setting of the valve which works against the load pressure can be infinitely varied. Thus, when the pressure setting is reduced, the restriction is reduced. The restriction induced by the valve is also reduced when a fluid pressure is present at the pilot chamber. By lowering the valve setting, the pressure required to open the valve in the pilot chamber is reduced and the valve can open further. Advantageously, this operating function can be substantially unaffected by the ratio between the pilot chamber and the load port.

Compared to other motion control valves or counterbalance valves the pressure setting of a motion control valve according to the present disclosure can vary by current applied to the coil. In conventional counterbalance valves, pressure can only be varied by changing the compression of a mechanical spring. This requires that the mechanical spring be set to a worst-case condition or a highest load in the system, thereby causing excessive heat to be generated in the system. The electrical control of a motion control valve according to the present disclosure allows it to be used to increase the optimization of the motion control pressure and therefore system efficiency.

In yet another aspect, the disclosure describes a pilot-operated, spring-biased motion control valve. In this embodiment, the space required for the spring acting against the load pressure is reduced relative to known structures. The pilot-operated counterbalance (POCB) valve typically requires less space than direct-acting springs, particularly in the case where the spool diameter increases.

Figure 1:
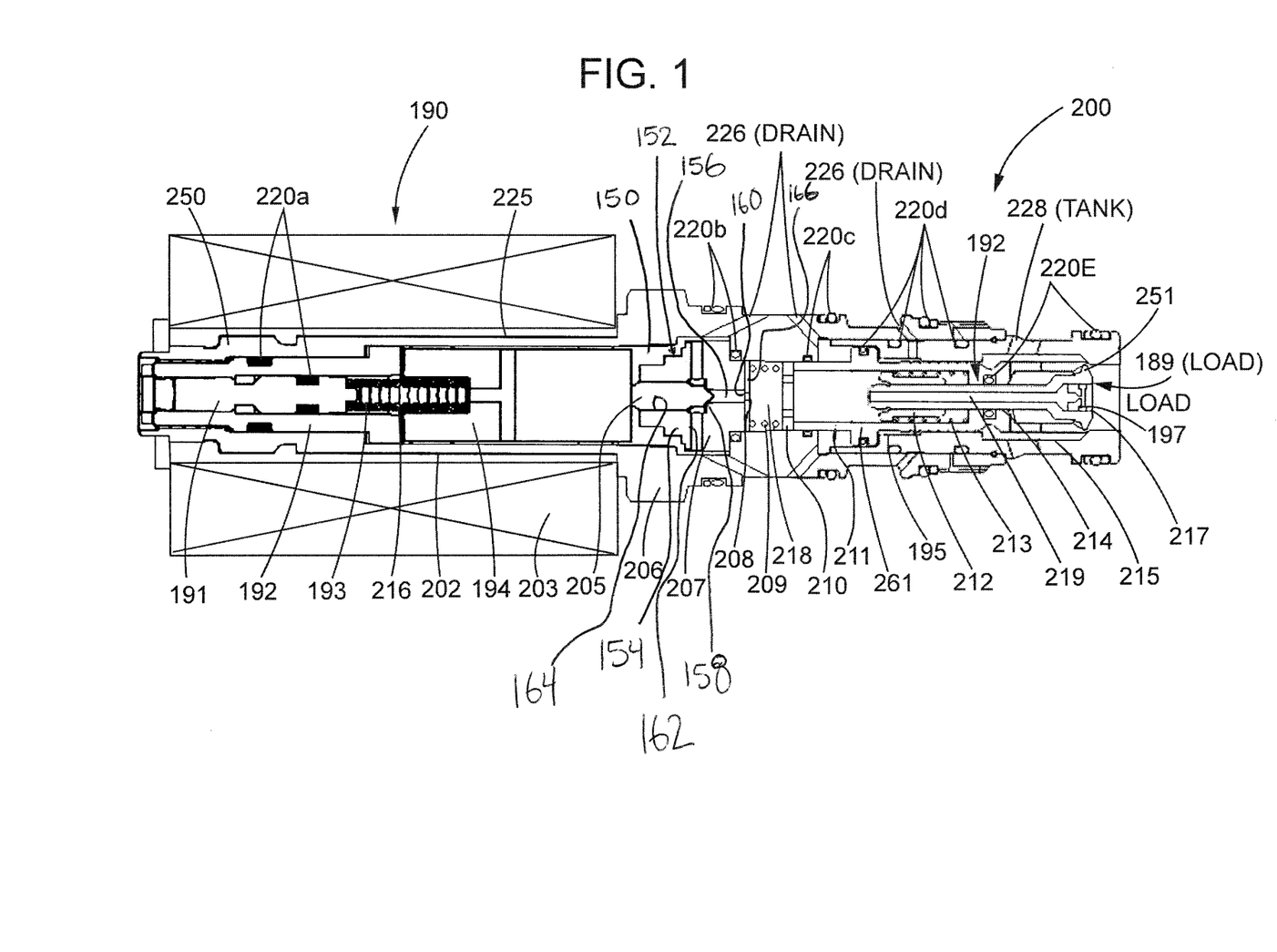
FIG. 1 is an elevational view, in cross section, of an embodiment of a proportional motion control valve (PMCV) in accordance with the disclosure.

Turning now to the Figures, FIG. 1 is a cross section of one embodiment of a proportional motion control valve (PMCV) 200 in accordance with the disclosure. As shown, the valve 200 includes an electro-magnetic actuator 190, a cage 215 mounted to the electro-magnetic actuator 190, and a spool 211 which is slidably disposed within the cage 215.

The electro-magnetic actuator 190 includes a solenoid coil 203 wound around and mounted to a hollow guide tube or valve body 202, a movable plunger or armature 194 slidably arranged within the guide tube 202, and a pole piece 192 anchored within the guide tube 202. The armature 194 and the pole piece 192 are preferably fabricated from a magnetic material, such as soft iron.

The guide tube 202 is a brazed assembly including a plug portion 250, a hollow tube section 225, and an adapter 206. The adapter 206 provides an interface between the cage 215 and a valve cavity (not shown).

The geometry of the pole piece 192, the armature 194 and the solenoid coil 203 mounted around the hollow tube section 225 determines the magnetic force characteristic of the solenoid actuator 190 as will be readily appreciated by those skilled in the art. During operation, the magnetic force between the pole piece 192 and the armature 194 is proportional to a current or excitation applied to the coil, via conventional means, and acts to urge the armature 194 toward the pole piece 192.

When the solenoid coil 203 is electrically energized with current, a magnetic field (or flux) is produced within the guide tube 202 which exerts a longitudinal force on the armature 194. This longitudinal force is proportional to the current supplied to the solenoid coil 203 and causes the armature 194 to move within the guide tube 202 in the direction of the pole piece 192. A magnetic attractive force between the armature 194 and the pole piece 192 exerts a second longitudinal force on the armature 194 which supplements the longitudinal force provided by the solenoid coil 203.

A main spring 193 is disposed between the armature 194 and an adjusting screw 191, which is disposed at an end of the hollow tube section 225 opposite the adapter 206. The spring adjuster 191 is seated within a bore of the pole piece 192. The armature 194 has a generally cylindrical bore. The armature 194 is slidably disposed within the bore of the guide tube 202 adjacent the spring adjuster 191. The main spring 193 is disposed within the longitudinal bores of the pole piece bore 192 and the armature 194.

The main spring 193 abuts the spring adjuster or adjustable plug 191 and the armature 194 to provide a biasing force against the armature 194. The main spring 193 thus provides a biasing force to close the valve 200 against pressure present at an inlet or load port 189 thereof, as is described in more detail below. The adjustable plug 191 is disposed within the valve body and is adapted to adjust the spring force applied by the spring 193. In the illustrated embodiment, the adjusting screw 191 is used to set a maximum control pressure limit of the valve 200. The adjustable plug 191 can be adjusted manually such that a net closing force on the pilot-operated valve corresponds to a maximum system pressure setting.

A gap is defined between the pole piece 192 and the armature 194, respectively. The gap has a generally frusto-conical shape and extends around the perimeter of the main spring 193. A flexible, non-magnetic residual washer 216 is disposed within the gap. The washer 216 has a hole, through which the main spring 193 extends, and is generally planar. The washer 216 is preferably brass, but may be bronze, plastic, stainless steel, or any other non-magnetic material with spring-like characteristics. The washer 216 can be similar in other respects to a washer as shown and described in U.S. Pat. No. 6,267,350, which is incorporated herein in its entirety by this reference.

The residual washer 216 helps prevent the armature 194 from latching to the pole piece 192 via residual magnetism between the armature 194 and pole piece 192 when the coil is not active. Further, the non-magnetic residual washer 216 can act as a balancing force against a non-linear magnetic force, as is described in detail in U.S. Pat. No. 7,137,406, which is incorporated herein in its entirety by reference.

The valve body 202 is connected to the cage 215 and defines an internal cavity 150 that is fluidly connectable with the bore 195 of the cage 215. A pilot-operated valve 152 is disposed intermediately with respect to the cage 215 and the valve body 202 to fluidly isolate the internal cavity 150 of the valve body 202 from the bore 195 of the cage 215. The pilot-operated valve 152 is subjected to a hydraulic opening force of pilot fluid that is present in the bore 195 of the cage 215.

The pilot-operated valve 152 includes a housing 154 fixed within the cavity 150 of the valve body 202. The housing 154 includes a longitudinal passageway 156 having an interior opening 158 and an external opening 160. The longitudinal passageway 156 is in communication with a transverse pilot passageway 162 and a longitudinal bore 164. The housing includes a pilot seat 207 circumscribing the interior opening 158 of the longitudinal passageway. A member 166 having a damping orifice 208 is fixed at the opening 160 of the longitudinal passageway 156 of the housing 154 so that the damping orifice 208 communicates therewith. A pilot pin or poppet 205 is moveably disposed within the longitudinal bore 164 of the housing 154. The pilot pin 205 is adapted to sealingly engage the pilot seat 207.

The pilot pin 205 is slidably disposed in the longitudinal bore 164 of the housing and abuts the armature 194. The pilot pin 205 has a head with a circumference that is smaller than that of the longitudinal passageway 156. The head has a tip that is seated in the interior opening 158 of the longitudinal passageway 156 of the housing 154 when the valve 200 is in a closed position, as shown in FIG. 1.

The armature 194 abuts and pushes against the pilot pin 205 of the pilot-operated valve. In turn, the pilot pin 205 pushes against and sealingly engages the pilot pin seat 207. In the cross section of FIG. 1, a damping orifice 208 is disposed on the right side of the figure relative to the pilot pin seat 207.

A bias spring 209 is located between the damping orifice 208 and a washer 210. The bias spring 209 imparts a force on the spool 211 through the washer 210 that holds the spool 211 in contact with a spool seat 251.

The spool 211 is moveably disposed within a longitudinal bore 195 defined within the cage 215. The spool 211 defines an inner longitudinal bore 196 extending therethrough that accepts and guides a poppet 214. The poppet 214 is moveably disposed within the bore 196 of the spool 211. The poppet 214 is biased against a poppet seat 197 by a spring guide 212 cooperating with a poppet bias spring 213, as shown in FIG. 1.

A filter core 217 can be provided in the free end of the poppet 215, opposite the poppet bias spring 213. The filter core 217 can operate to inhibit the ingress of debris into the valve 200 from the load port 189, as is described in more detail in U.S. Pat. No. 6,267,350, which is incorporated herein in its entirety by reference.

During operation, oil present at the load port 189 may flow past the filter core 217 and enter a poppet flow channel 219, which is illustrated as a bore extending concentrically and longitudinally through the poppet 215. Oil passing through the poppet flow channel 219 is provided to a damping chamber 218, which is defined between the washer 210 and the damping orifice 208 and which houses the bias spring 209.

Resilient seals, which are illustrated as o-rings and back-up rings, are depicted generally as items 220a through 220e. These resilient seals provide sealing between the various ports and internal components of the PMCV 200, as well as prevent external leakage.

An electric signal can be applied to the coil 203 to provide a magnetic force acting on the armature 194 that causes motion of the armature 194 toward the pole piece 192 such that the closing spring force can be selectively adjusted. The electric signal can be adapted to provide an infinitely variable closing spring force.

In one mode of operation, the PMCV 200 may operate as a pressure relief valve. In this mode, hydraulic oil pressure present at the load port 189 causes a flow of oil to follow a flow path extending between the load port 189, the filter core 217, the poppet flow channel 219, and the damping chamber 218. Oil entering the damping chamber 218 increases the pressure thereof and imparts an increasing hydraulic force tending to unseat the pilot pin 205 from the pilot pin seat 207. When the hydraulic force has sufficiently increased and is at least equal or greater than the force tending to seat the pilot pin 205, which is imparted in a closing direction by the main spring 216 as previously described, the pilot pin 205 disengages the pilot pin seat 207 and oil is permitted to drain from the damping chamber 218 through a drain port 226 of the PMCV 200.

When oil is draining from the damping chamber 218 of the valve 200 in this fashion, pressure in the damping chamber 218 decreases, thereby causing the spool 211 and the poppet 215 to move together toward the pilot pin seat 207. The spool 211 continues to move toward the pilot pin seat 207 and oil from the load port 189 can drain out of the valve 200 to a tank or reservoir (not shown) that is fluidly connected to the tank port 228 (for example, the reservoir 104 shown in FIG. 3).

In this mode of operation, fluid pressure present at the load port 189 that is sufficient to provide a hydraulic force that overcomes the opposing force provided by the main spring 193 onto the pilot pin 205 advantageously varies in relation to the current applied to the coil (not shown) that drives the armature 194. The load pressure that is sufficient to overcome the force of the main spring 193 varies in relation to the current applied to the solenoid coil. For instance, the resulting force on the pilot pin 205 from the main spring 216 is at its greatest when no current is applied to the coil. Increasing current provided to the coil causes a magnetic counter force applied to the main spring 193 by the magnetic attraction between the armature 194 and the pole piece 192. This magnetic counter force results in an overall reduction of the net force tending to maintain the pilot pin 205 seated. In the illustrated embodiment, the reduction of the seating force on the pilot pin 205 has a substantially linear relationship relative to the current applied at the coil. Thus, the relief pressure of the valve 200, as described herein, may be selectively adjusted by providing a desired current to the coil.

In a second mode of operation, the valve 200 may operate in a non-overrunning load and non-relief function. In this mode, fluid at a source pressure present at the upstream side of the load is provided to the pilot port 227. The pilot port 227 fluidly communicates with a portion of the bore 195 that forms a chamber that accommodates the largest diameter portion of the spool 211. In this circumstance, the spool 211 and the poppet 215 begin to travel together toward the pilot seat 207. The pressure of fluid present in the damping chamber 218 increases in proportion in response to the pressure of fluid provided to the pilot port 227, which will be referred to hereafter as pilot pressure. The pressure in the damping chamber 218 will continue to increase until it becomes at least equal to the pressure of fluid that is present at the load port 189 (hereafter, load pressure), at which time the pilot pin 205 will lift off its seat 207 and oil from the damping chamber 218 will begin venting through the drain port 226 as previously described.

When operating in the second mode, the poppet 215 and spool 211 will continue to travel toward the pilot pin seat 207 as pilot pressure increases while oil is allowed to freely flow between the load port 189 and a tank port 228, which is a port fluidly connected to a tank or reservoir of the system. The pilot pressure that can overcome the force of the main spring 193, as previously described, will vary in relation to the current applied to the coil. When no current is applied, the force induced by the main spring 193 is at its greatest and the pilot pressure required to move the spool 211 is also at its greatest. Increasing current applied to the coil will reduce the net force applied on the pilot pin 205 in a linear fashion. The pilot pressure required to move the spool 211 will then vary, for example, decrease, based on a ratio between the large diameter 261 of the spool 211 in relation to the small diameter defined by the spool seat of the cage 251, as well as the change in current. Effectively, the current provided to the coil constitutes a selectively controlled pressure setting for the PMCV 200, which can be selectively and infinitely adjusted when the pressure at the load port 189 is constant or when it is increasing. That is, the pressure setting can be controlled in an inverse relationship relative to the fluid pressure at the load port 189.

In a third mode of operation, the valve 200 performs an overrunning load control function. In this mode, the valve 200 operates substantially the same as described above relative to the second mode of operation, but the difference in this third mode of operation is that the pilot pressure applied at the pilot port 227 will have a decreasing trend. Under these conditions, the current applied to the coil can be adjusted such that the pressure setting will effectively increase in response to the decreasing pressure at the pilot port 227. By varying the current provided to the coil to increase the pressure setting of the valve 200, similar to what was previously described, the pressure of fluid in the damping chamber 218 will tend to increase. In this condition, the spool 211 will begin to move away from the pilot pin seat 207. In effect, the valve 200 will begin to restrict the flow of oil passing therethrough and, in turn, control the motion of the overrunning load by effectively causing an increase of the pressure of fluid present at the load port 189.

In general, the proportional motion control valve can effectively control the flow of hydraulic oil out of a cylinder, hydraulic motor, or other hydraulic actuator when used as part of a hydraulic system. If the load attached to the actuator begins to move faster than the pump flow can supply the actuator (i.e. an overrunning load), the PMCV 200 will close to restrict flow out of the load actuator, for example, the actuator 118 as shown in FIG. 3. When the load is not overrunning, the spool 211 is piloted open by load pressure applied to the pilot port 227. In this condition, a flow of fluid from the pump will pass through the PMCV 200 at a low restriction due to the ability to decrease the force of the main spring 216 by the application of a current to the coil, as previously described. In other words, the spool 211 can be piloted open at a lower load pressure applied at the pilot port 227 by decreasing the spring value. Thus, the load pressure falls even further than in comparison to no change in spring setting. If the load pressure falls, the machine efficiency (i.e. fuel efficiency) can be improved.

Similarly, the pressure setting of the PMCV 200 can be rapidly increased when the load does begin to overrun the pump flow. In this condition, the current in the valve will be changed, for example, decreased, such that the force of the main spring 216 will increase. By increasing the main spring setting, the load pressure increases and thus the motion of the load is controlled. The spring setting is only increased to the point that the load pressure begins to increase or remain constant. Thus, by increasing the setting only to a level that controls the load (i.e. positive pump pressure) the restriction can be optimized and therefore the heat generated can be reduced.

The rate of change of the current applied to coil in this condition can vary based on the rate of change of pressure of fluid present at the pilot port 227. This rate of change in setting can be accomplished by any type of control scheme, for example, by use of an electronic controller operating a feedback-based control algorithm, such as a proportional, integral, and derivative (PID) control algorithm, or any other type of suitable algorithm, such as a feed-forward algorithm, a fuzzy logic algorithm, for example.

Figure 2:
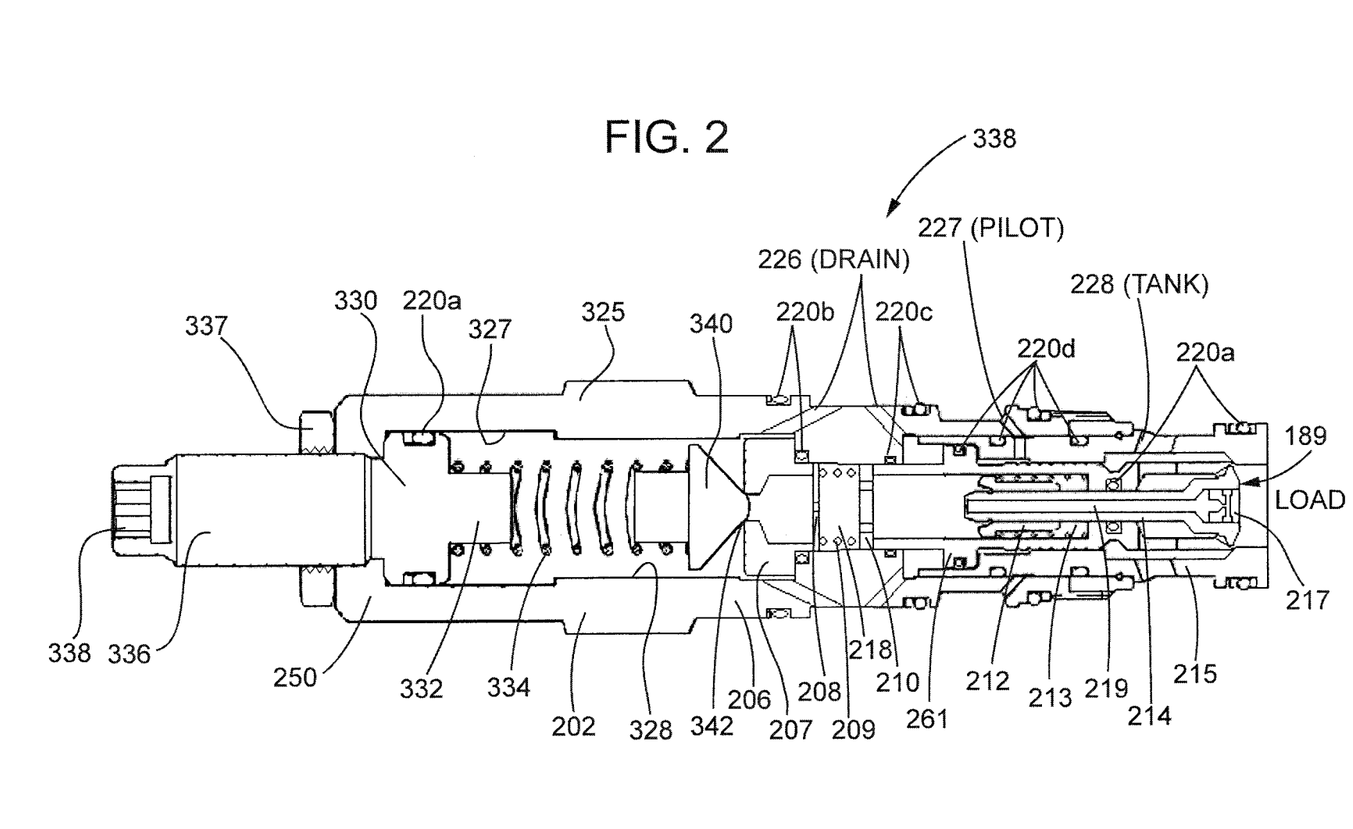
FIG. 2 is an elevational view, in cross section, of an embodiment of a pilot-operated counterbalance (POCB) valve in accordance with the disclosure.

A cross section of one embodiment of a non-electronically controlled valve, which is referred to herein as a pilot operated counterbalance valve (POCB) 300 is shown in FIG. 2. In the illustration of FIG. 2, structures or elements that are the same or similar to corresponding structures or elements already described in reference to FIG. 1 are denoted by the same reference numerals for simplicity. As can be seen when comparing the POCB 300 as shown in FIG. 2 with the PMCV 200 as shown in FIG. 1, the cage 215, spool 214, as well as the various ports 226, 227, 228, and 189 of the two valves 200 and 300 are arranged in a similar fashion. Unlike the PMCV 200, however, the POCB 300 is not electrically actuated.

The POCB 300 has a selectively set pressure setting that can be set to match a specific system in which the POCB 300 is installed. For a typical application, for example, the pressure setting of the POCB 300 may be set to match the maximum pressure the system in which it is installed is expected to attain. For this reason, the POCB 300 does not require an electrically controlled, infinitely variable pressure setting capability as does the PMCV 200 previously described, but it does require adequate resolution in the pressure setting to enable a user to finely and accurately set the pressure setting for a corresponding system.

To this end, the POCB 300 includes a hollow tube 325 that internally defines and encloses an elongate bore 327 and a stopper valve chamber 328, which are disposed concentrically adjacent to one another along a centerline of the tube 325. A plug portion 330 is slidingly and sealingly disposed within the elongate bore 327 and defines a spring guide portion 332 that, as shown, interfaces with and guides the main spring 334.

A compressive preloading of the main spring 334 can be set by appropriate positioning of the plug portion 330 in the POCB 300. In the illustrated embodiment, the plug portion 330 is connected to a threaded member 336 that threadably engages a lock washer 337 as well as a threaded portion defined at the end of the hollow tube 325. The threaded portion 336 includes a driver cavity 338, for example, an internal hex-type feature, which can accommodate a tool or a handle (not shown) that provides for the manual adjustment of the preload of the main spring 334 by appropriate positioning of the plug portion 330 within the elongate bore 327. The main spring 334 acts onto a conical valve member 340, which forms a seal 342 when seated against the pilot pin seat 207. It should be appreciated that the conical valve member 340 provides a function that is similar to that of the pilot pin 205, which is shown and described relative to the embodiment of FIG. 1.

In general, the POCB 300 is capable of operating in the same or a similar fashion to the PMCV 200 except that it lacks the capability of continuous and automatic adjustment of its pressure setting during operation.

Referring to FIG. 3, a circuit schematic of a hydraulic system 100 is shown. The system 100 includes a pump 102 connected to a tank or reservoir 104 and arranged to draw fluid therefrom. The pump 102 represents a source of oil flow/pressure. An outlet passage 106 of the pump 102 is connected to two proportional flow control valves (FCV) 109, which are arranged in a parallel circuit arrangement. The system 100 further includes two proportional motion control valves (PMCV) 108, each of which is connected to an actuator 118 via fluid passages 116. The actuator 118 is in the form a hydraulic cylinder that represents the load. The load is The two PMCV 108 operate to exhaust a flow of oil returning from the actuator 118 through the passages 116.

Each PMCV 108 includes a solenoid actuator 110 acting against a pressure of fluid present in a respective exhaust passage 12. The actuator 110 acts against a spool 13, which is generically shown in this figure, against the exhaust pressure present in the respective exhaust passage 12. The actuator 110 can maintain the position of the spool 13 stationary until the exhaust pressure exceeds the actuator pressure setting. The spool 13, and its interaction with the solenoid actuator 110 are described in more detail relative to FIG. 1.

An outlet port of each FCV 109 is fluidly connected to a supply or return fluid passage 116 of the actuator 118. In the illustration of FIG. 3, the actuator 118 is shown as a piston-type linear actuator that pivots about a pivot point 120 and includes a plunger 122 moveable when pressurized fluid is provided to either one of the fluid passages 116. The actuator 118 is shown as a piston-type linear actuator solely for purpose of illustration. It is contemplated that any other type of hydraulic or hydrostatic actuator may be used, for example, a rotary actuator, motor, and so forth.

The illustration of FIG. 3 includes qualitative views of the actuator 118 during three different operating conditions. In a first operating condition 124, the FCV 109 appearing in the lower left portion of the schematic is actuated to provide oil from the pump into the base of the actuator 118. The PMCV 108 appearing in the upper right portion of the schematic is also actuated to allow fluid to exit the upper portion of the actuator 118. Further, current is provided to the actuator 110 of the PMCV 108 appearing in the upper left portion of the schematic to limit the maximum pressure inside the actuator 118.

Typically, a separate relief valve (not shown) may be incorporated into the control lines 116 in order to limit the maximum pressure in the actuator, but such relief valves may advantageously be omitted from the circuit 100 because the pressure setting of the PMCVs 108 can be selectively, infinitely varied by adjustment of the current provided to the respective actuators 110. In an alternate embodiment, the PMCV 108 or a similarly arranged valve may be electronically and selectively varied between two or more discrete valve positions or settings.

Figure 3A:
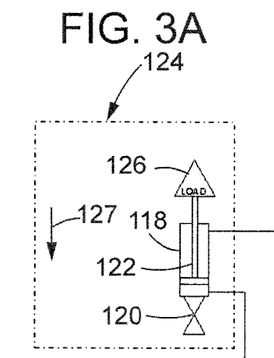
FIG. 3 is a schematic view of an embodiment of an application circuit in accordance with the disclosure showing an actuator in three operating conditions in FIGS. 3a-3c.

Referring to FIG. 3a, in the illustrated embodiment, fluid in the base of the actuator 118 is pressurized and applies a force that lifts a load 126, which is shown generically, against the force of gravity 127 as oil flows through the FCV 109. In the illustration, the force of gravity 127 is illustrated in a downward direction and is denoted by a solid-line arrow. In this first operating condition 124, the actuator 118 stands generally vertical relative to the pivot point 120, and a flow of pressurized fluid from the pump 102 fills a lower chamber of the actuator 118 below the plunger 122 to lift the load 126. As can be appreciated, the motion of the load 126 is directly relative to the flow of fluid from the pump 102, which means that the first operating condition 124 is a non-over-center mode of operation.

The load 126 is being pulled down by gravity 127 as if it were an overrunning load. The pressure transducer measures the load pressure down stream of the FCV 109 but upstream of the inlet to the cylinder 118 moving the load 126. When the cylinder 118 is moving the load 126 as shown in FIG. 3a, the load pressure 404 is steady as shown in the graph in FIG. 4, and the pressure setting of the PMCV 108 is driven to the lowest setting.

Figure 3B:
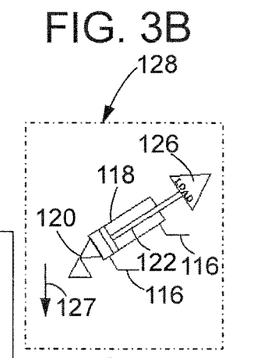

A second operating condition 128 is shown in FIG. 3b, with fluid connections to the fluid passages 116 omitted for simplicity. In the second operating condition 128, the actuator 118 is shown tilted down from the vertical position relative to the pivot point 120. In this condition, the linear extension or retraction of the actuator 118 in displacing the load 126 depends only partly on the flow of fluid from the pump 102. More specifically, in this condition, a vertical component of the weight of the load 126 will affect the total force applied by the actuator 188 and, further, yield a rotational moment that tends to rotate the actuator 118 relative to the pivot point 120. In other words, while the first operating condition 124 represents a non-over-center position of the load 126, the second operating condition 128 represents a transition to an over-center mode of operation, but not to the extent that the load 126 is in an over-center position yet because extension of the actuator 118 still works against the weight force applied by the load 126.

Figure 5:
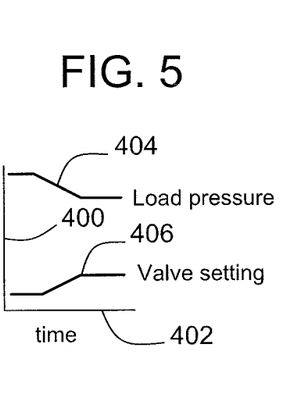

When the cylinder 118 moves as shown in FIG. 3b, the load 126 begins to decrease and the pressure setting of the PMCV 108 begins to increase. The change in load pressure 404 and pressure settings 406 relating to this second operating condition are shown in FIG. 5.

Figure 3C:
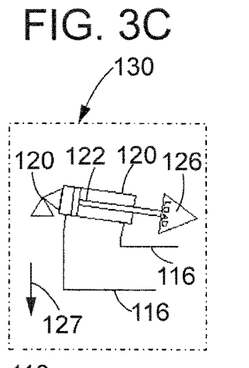

As can be appreciated, a third operating condition 130 that represents an over-center arrangement of the load 126 relative to the actuator 118 is shown in FIG. 3c. As before, fluid connections between the fluid passages 116 and the circuit have been omitted for clarity. In the third operating condition 130, the actuator 118 is shown tilted in a downward direction relative to the pivot point 120, which means that the weight of the load 126 acts in a direction tending to extend the actuator 118.

Figure 6:
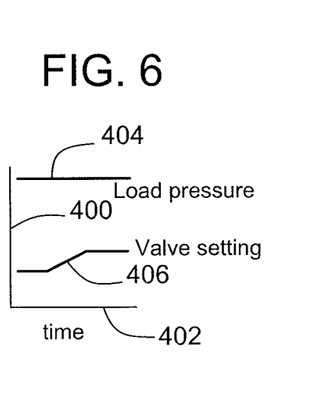

When the load 126 moves to an over center condition as shown in FIG. 3c, the pressure setting of the PMCV 108 is driven to the maximum setting. The load pressure 404 and the pressure setting 406 for the over center condition of FIG. 3c are shown in FIG. 6.

Each PMCV 108 advantageously provides control of fluid returning from the actuator 118 under all three operating conditions 124, 128, and 130, such that control over motion of the load 126 can be maintained at all times. To this end, the circuit 100 is associated with an electronic controller 132, which is connected to various components of the circuit 100 via appropriate communication lines 134. The communication lines 134 are arranged to provide two-way communication of sensor signals, actuator command signals, and any other type of information that may be used to control the circuit 100.

In yet another mode of operation, the pressure setting of both PMCVs can be selectively reduced to such a low setting that oil can freely flow between the inlet and exhaust. Such a mode allows the load to float. The pressure setting of the PMCV can be driven or set to zero to allow oil to flow from the load work ports of the hydraulic circuit to the tank and back from the tank. Thus, the load is able to "float" at tank pressure. This valve can be used to provide the float mode to thereby reduce the number of valves in the circuit. Typically, two to three extra valves would be required to obtain the float mode operability.

In the illustrated embodiment, the electronic controller 132 is connected to the solenoid actuator 110 of each PMCV 108 and arranged to provide a proportional command signal, for example, a current setting, to each as is discussed hereafter. The electronic controller 132 is further connected to one or more pressure transducers 136 (two shown in FIG. 3). Although fewer or more than two pressure transducers 136 or other types of pressure sensors may be used, the pressure transducers 136 in the illustrated embodiment are fluidly connected with a fluid pilot passage 10 leading to the pilot port of each PMCV 108. The pressure transducers 136 provide pressure signals via the communication lines 134 to the electronic controller 132 that are indicative of the pressure of fluid in the actuator 118.

Figure 4:
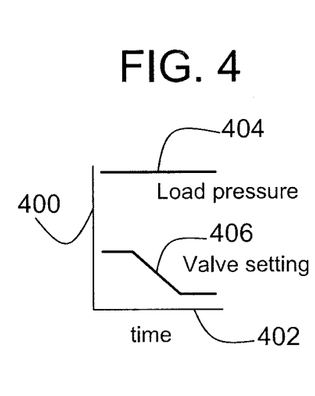
FIGS. 4-6 are qualitative graphical charts of illustrative valve settings versus load pressure for three different modes of operation in accordance with the disclosure which correspond to the operating conditions shown in FIGS. 3a-3c.

In reference to FIGS. 4-6, qualitative charts are shown to illustrate the effect of controlling load pressure in the PMCV 200. In each chart, a pressure level 400 of fluid at the load port 189 (FIG. 1) and the pressure setting of the valve is plotted over time 402.

When the actuator is in a non-over-center condition, as shown in FIG. 4, the load pressure 404 remains generally constant and the pressure or valve setting 406 of the valve, as dictated by the current applied to the coil of the valve, is reduced over time to reduce inefficiency in the system. As the load slowly transitions toward an over-center condition, the load pressure 404 begins to decrease and, in response, the valve setting 406 increases, as shown in FIG. 5. Finally, when the load is in an over-center condition, the load pressure 404 is advantageously maintained constant, thus allowing the pump control over the motion of the load, and the valve setting 406 is increased, in certain instances, up to its maximum setting, as shown in FIG. 6.

Figure 7:
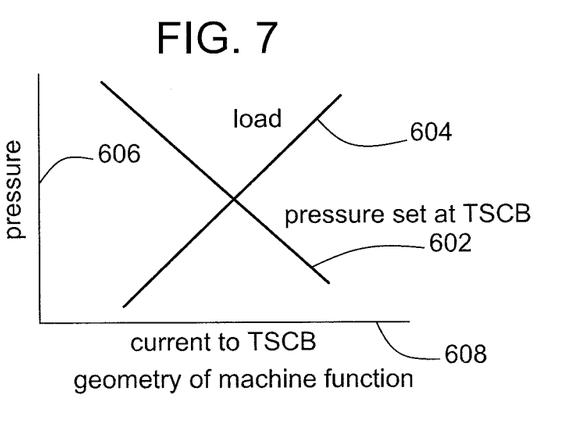
FIG. 7 is a qualitative graphical illustration of an embodiment of a transfer function of pressure setting versus load in accordance with the disclosure.

FIG. 7 represents a qualitative transfer function for controlling the current to the PMCV 200. The pressure setting 602 versus load pressure 604 are shown plotted against a pressure value 606 long the vertical axis and a current value 608 along the horizontal axis. As can be seen from the Figure, the pressure setting 602 is inversely proportional to the load pressure 604 in linear fashion.

In one arrangement, a pressure transducer is provided to measure the load sense pressure of the work port. The pressure setting is adjusted in inverse relationship to the load pressure. In cases where the load pressure is low, the machine is likely going over center. As such, the pressure setting of the PMCV is driven to enable the maximum pressure to provide the maximum capability of motion control. To provide a safety margin when decreasing the pressure setting of the PMCV, a predetermined minimum set pressure level of the PMCV can be established. The minimum pressure level can be established such that there is pressure available so the PMCV can control the motion of an overrunning load.

In one embodiment, a proportional motion control valve can be used in an application circuit and a method of controlling the proportional motion control valve can be performed. A load pressure in a circuit arrangement between an actuator and a pump is sensed. A load pressure signal corresponding to the sensed load pressure is sent to an electronic controller. The electronic controller is operably connected to an electro-mechanical actuator of a proportional motion control valve. A pressure setting of the proportional motion control valve is adjusted by providing a command signal to the electro-mechanical actuator. The command signal is based on the load pressure signal.

The circuit arrangement can be in the form of a bridge circuit arrangement. The electronic controller can be operably connected with one or more electro-mechanical actuators associated with each of a first and second proportional motion control valve. The adjusting step can include adjusting a pressure setting of each of the first and second proportional motion control valves. The proportional motion control valve can be operated to provide a substantially unrestricted flow of fluid between a load port and a tank port of the valve. The command signal can be adjusted to provide a safety relief function.

The electronic controller can be adapted to execute computer readable instructions for providing a closed-loop control function of the command signal having the load pressure signal as a feedback. In one aspect, the closed-loop control function can adjust the pressure setting in an inverse relationship to the load pressure signal.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of controlling a proportional motion control valve, comprising:
   sensing a load pressure in a circuit arrangement between an actuator and a pump;
   sending a load pressure signal corresponding to the sensed load pressure to an electronic controller, the electronic controller being operably connected to an electro-mechanical actuator of a proportional motion control valve; and
   adjusting a pressure setting of the proportional motion control valve by providing a command signal to the electro-mechanical actuator, wherein the command signal is based on the load pressure signal; and
   wherein the proportional motion control valve includes:
      a cage having a longitudinal bore,
      a spool moveably disposed within the bore of the cage, the spool having a longitudinal bore,
      a poppet moveably disposed within the bore of the spool,
      a valve body connected to the cage and defining an internal cavity that is fluidly connectable with the bore of the cage,
      a pilot-operated valve disposed intermediately with respect to the cage and the valve body to fluidly isolate the internal cavity of the valve body from the bore of the cage, the pilot-operated valve being subjected to a hydraulic opening force of pilot fluid that is present in the bore of the cage, the pilot-operated valve including: (i) a housing fixed within the cavity of the valve body, the housing including a longitudinal passageway having an interior opening and an external opening, the longitudinal passageway being in communication with a transverse pilot passageway and a longitudinal bore, and the housing including a pilot seat circumscribing the interior opening of the longitudinal passageway, (ii) a member having a damping orifice, the member disposed at the external opening of the longitudinal passageway of the housing so that the damping orifice communicates with the longitudinal passageway, and (iii) a pilot pin moveably disposed within the longitudinal bore of the housing, the pilot pin adapted to sealingly engage the pilot seat, and
      a spring disposed within the internal cavity of the valve body and arranged to subject the pilot-operated valve to a closing spring force.

2. The method of controlling a proportional motion control valve of claim 1, wherein the circuit arrangement comprises a bridge circuit arrangement, the proportional motion control valve comprises a first proportional motion control valve, and the electronic controller is operably connected with one or more electro-mechanical actuators associated with a second proportional motion control valve, and wherein the adjusting step includes adjusting a pressure setting of each of the first and second proportional motion control valves.

3. The method of claim 1, wherein the electronic controller is adapted to execute computer readable instructions for providing a closed-loop control function of the command signal having the load pressure signal as a feedback.

4. The method of claim 3, wherein the closed-loop control function adjusts the pressure setting in an inverse relationship to the load pressure signal.

5. The method of claim 1, further comprising:
   operating the proportional motion control valve to provide a flow of fluid between a load port and a tank port of the valve.

6. The method of claim 1, further comprising:
   adjusting the command signal to provide a relief function.

7. The method of claim 1, wherein the proportional motion control valve includes an adjustable plug disposed within the valve body and adapted to adjust the spring force applied by the spring.

8. The method of claim 7, further comprising:
   adjusting the adjustable plug of the proportional motion control valve such that a net closing force on the pilot-operated valve corresponds to a maximum system pressure setting.

9. The method of claim 1, wherein the proportional motion control valve includes a solenoid actuator mounted to the valve body, the solenoid actuator including a coil, an armature, and a pole piece, the coil disposed around the armature, the pole piece and the armature disposed within the internal cavity of the valve body, the spring disposed between the pole piece and the armature, and the armature disposed between the spring and the pilot-operated valve, the spring urging the armature into contacting relationship with the pilot pin.

10. The method of claim 9, wherein the command signal is applied to the coil to provide a magnetic force acting on the armature that causes motion of the armature toward the pole piece such that the closing spring force can be selectively adjusted.

11. The method of claim 10, wherein the command signal is adapted to provide an adjustable closing spring force over a bounded range of closing spring forces.

12. The method of claim 10, wherein the armature is arranged to occupy a finite number of predetermined positions within the internal cavity such that the closing spring force is incrementally adjustable between a high setting and a low setting.

* * * * *